(12) United States Patent
Crooks

(10) Patent No.: US 9,471,822 B1
(45) Date of Patent: Oct. 18, 2016

(54) DEMARCATING A REDACTION AREA WITHIN A FIELD OF VIEW OF A VIDEO STREAM

(71) Applicant: NCR Corporation, Duluth, GA (US)

(72) Inventor: John Crooks, Duluth, GA (US)

(73) Assignee: NCR CORPORATION, Duluth, GA (US)

( * ) Notice: Subject to any disclaimer, the term of this patent is extended or adjusted under 35 U.S.C. 154(b) by 0 days.

(21) Appl. No.: 14/712,177

(22) Filed: May 14, 2015

(51) Int. Cl.
*G06F 17/00* (2006.01)
*G06F 19/00* (2011.01)
*G06K 7/10* (2006.01)

(52) U.S. Cl.
CPC ....... *G06K 7/10821* (2013.01); *G06K 7/10722* (2013.01)

(58) Field of Classification Search
CPC ..................... G06K 7/10821; G06K 7/10722; G06K 9/00228
USPC ..................... 235/383, 385, 462.01, 375, 379
See application file for complete search history.

(56) References Cited

U.S. PATENT DOCUMENTS

| | | | | |
|---|---|---|---|---|
| 7,802,305 | B1 * | 9/2010 | Leeds | G06F 17/2735 715/230 |
| 8,844,812 | B1 * | 9/2014 | Rivera | G06K 7/01 235/375 |
| 2006/0242558 | A1 * | 10/2006 | Racovolis | G06F 17/241 715/205 |
| 2006/0259983 | A1 * | 11/2006 | Sperry | G06F 21/6245 726/28 |
| 2008/0216151 | A1 * | 9/2008 | Miyazaki | G06F 21/64 726/2 |
| 2008/0294903 | A1 * | 11/2008 | Miyazaki | G06F 21/64 713/176 |
| 2009/0006990 | A1 * | 1/2009 | Ossesia | G09G 5/346 715/763 |
| 2009/0296166 | A1 * | 12/2009 | Schrichte | G06Q 10/10 358/474 |
| 2010/0043267 | A1 * | 2/2010 | Sterling | G09F 3/10 40/638 |
| 2015/0363655 | A1 * | 12/2015 | Artan | G06K 9/00228 382/103 |

* cited by examiner

*Primary Examiner* — Tuyen K Vo
(74) *Attorney, Agent, or Firm* — Schwegman, Lundberg & Woessner

(57) ABSTRACT

A system, such as a barcode scanner, can include a camera directed at a scene. The scene can include an area that occasionally includes sensitive information; such an area can include a keypad for entering PINs or a tray for writing checks. The system can generate a video stream of the scene. The system can recognize an object temporarily physically positioned within the scene. The system can demarcate a redaction area within a field of view of the video stream in response to the temporary position of the object in the scene. The system can blur, or otherwise obscure, the redaction area within the field of view of the video stream of the scene to form a redacted video stream of the scene. The system can output the redacted video stream of the scene, which can decrease a risk of theft of the sensitive information.

14 Claims, 7 Drawing Sheets

DEMARCATING A REDACTION AREA WITHIN A FIELD OF VIEW OF A VIDEO STREAM

BACKGROUND

Cameras are increasingly used in public locations. For example, a barcode scanner can use a camera to form images of products that include barcodes thereon. Such a camera can capture sensitive information, such as credit card numbers, personal identification numbers (PINs), routing and account numbers from checks, data from drivers' licenses, and others. As a result, images from such cameras can be targeted for fraudulent activity.

SUMMARY

In some examples, a method can include: receiving configuration data defining an image redaction area within an image captured by a camera of a barcode scanner; and redacting the image redaction area of subsequent images captured by the camera of the barcode scanner.

In some examples, a method can include: receiving an input video stream from a camera on a barcode scanner; forming a first redacted video stream by redacting a first image redaction area of the input video stream; forming a second redacted video stream by redacting a second image redaction area, different from the first image redaction area, of the input video stream; and simultaneously providing the first and second redacted video streams as outputs from the barcode scanner.

In some examples, a barcode scanner can include: a camera; at least one processor; and at least one memory, including instructions that, when executed on the at least one processor, cause the at least one processor to perform data processing activities comprising: receiving first configuration data defining a first image redaction area within an image captured by the camera; and redacting the first image redaction area of subsequent images captured by the camera to form a first redacted video stream.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
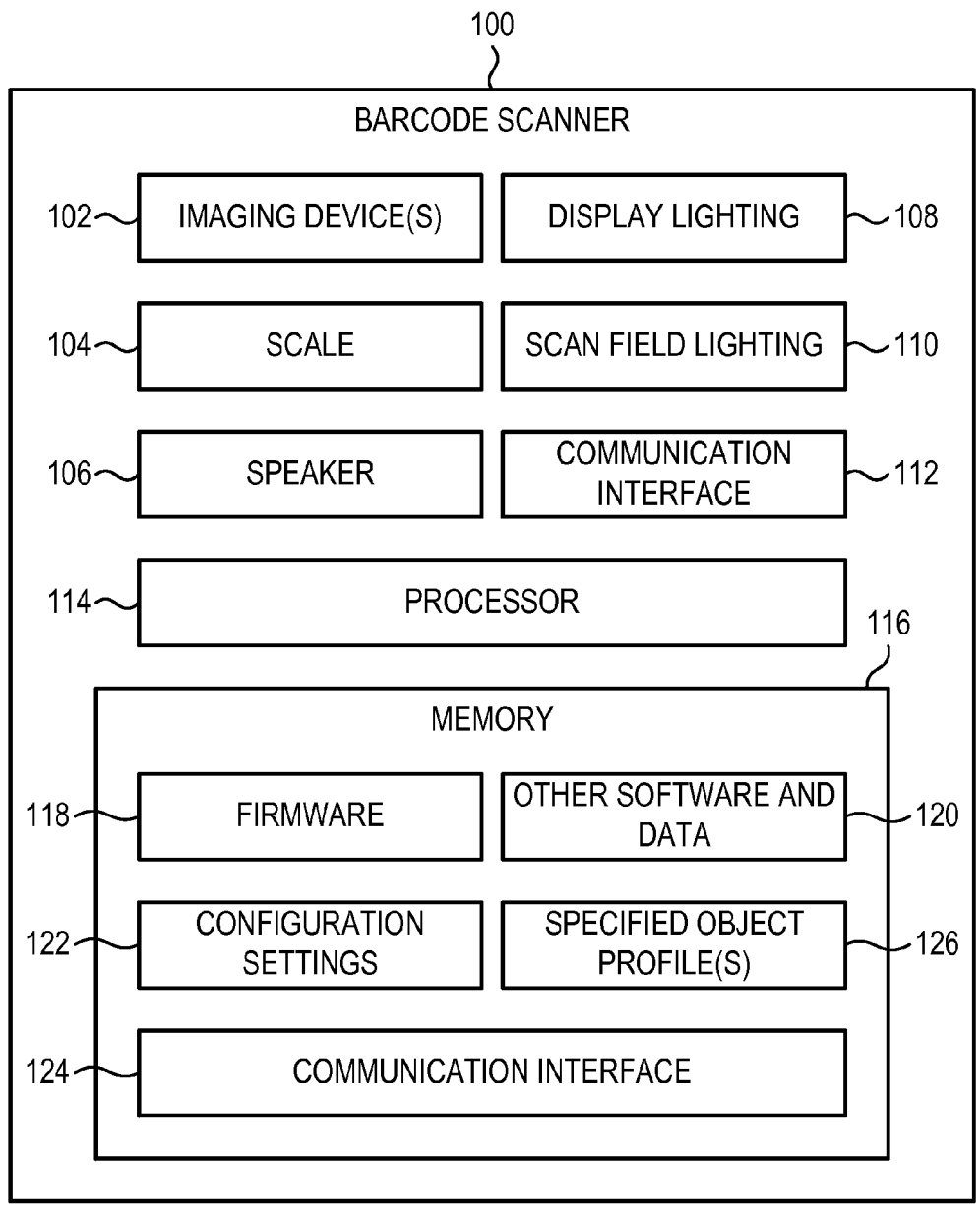
FIG. 1 shows a block diagram of an example of a barcode scanner, in accordance with some embodiments.

The following discussion uses a barcode scanner as an example of a device that includes a camera directed at a scene. It will be understood that the barcode scanner is but one example of a device that includes a camera directed at a scene. Other suitable examples can include a security camera positioned on a wall or ceiling of a store, a security camera positioned on or in an automated teller machine (ATM), and others.

A barcode scanner can include a camera that captures a video stream of images of products moved through a particular area or volume. A processor in the barcode scanner, or connected to the barcode scanner, and can identify barcodes in frames of the video stream. In some examples, a point-of-sale (POS) terminal, in communication with the barcode scanner, can look up checkout data associated with an item displaying the barcode, such as item description and item price, and can process the item in a checkout transaction.

In addition to capturing images of the barcodes, the camera in the barcode scanner can also undesirably capture sensitive information. For instance, the camera can include within its field of view a tray at which customers write checks, a ledge upon which customers place credit cards, or a keypad at which customers enter personal identification numbers (PINs). As modern scanners, such as the NCR REALSCAN 7879, can be connected to networks, either directly or indirectly via a POS terminal, video streams from cameras embedded in scanners may run the risk of being compromised.

In some examples, the camera can be stationary with respect to the scene, so that an area that can include sensitive information appears repeatedly at the same area in the field of view of the camera. For example, as a barcode scanner processes multiple transactions with multiple customers, a PIN keypad can appear at the same area in the field of view of the camera, for each transaction.

In some examples, the barcode scanner can be configured to redact a portion from each captured image included in the video stream, by blurring or otherwise obscuring one or more areas in the field of view of the camera. For example, the barcode scanner can be configured to blur the area of the field of view that includes the PIN keypad, while keeping the rest of the field of view unblurred. Redacting from a video stream in this manner can remove the sensitive information from the video stream, and can therefore reduce security risks associated with the video stream.

In some examples, during a configuration process, the barcode scanner can use a physical object temporarily placed within the scene to demarcate a redaction area within a field of view of the video stream. For instance, for the barcode scanner, a user can place a specified object over the PIN keypad. In some examples, the specified object can include a specified barcode. During configuration, the barcode scanner can acquire one or more frames of video, can recognize the specified object in the field of view of the video, can demarcate a redaction area at or around the specified object, and can optionally allow a user to refine the redaction area by moving the object and/or adjusting a boundary of the redaction area on a graphical user interface. Once the boundary of the redaction area is defined, the barcode scanner can obscure the redaction area of the field of view of the video stream, such as by blurring or shading, and can provide a redacted video stream as output from the barcode scanner. In some examples, the barcode scanner can provide both unredacted and redacted video streams as output. In some examples, the barcode scanner can provide multiple outputs that include different redaction areas.

The preceding paragraphs merely summarize various elements of some embodiments, and should not be construed as limiting in any way. These and other embodiments are further described herein with reference to the figures.

FIG. 1 shows a block diagram of an example of a barcode scanner 100, in accordance with some embodiments. As discussed above, a barcode scanner is but one example of a device that includes a camera directed at a scene. Other suitable devices having cameras can also be used.

Barcode scanner 100 can include one or more imaging devices 102. Each imaging device 102 can include a cover glass, which can face a checkout clerk during use. In some examples, more than one imaging device can share a single cover glass. Each imaging device 102 can include one or more focusing elements, such as a lens or a curved mirror, which can form an image of an area or volume proximate the cover glass. During use of the barcode scanner 100, a checkout clerk can scan items through the area or volume proximate the cover glass. Each imaging device 102 can include a camera, which can convert the image of the area or volume into a video signal. Each imaging device 102 can optionally include one or more folding mirrors, which can redirect or fold an optical path between a camera and the cover glass within a housing of the barcode scanner 100, and can therefore reduce a volume required for the optical path within the housing of the barcode scanner 100. In some examples, the barcode scanner 100 can include more than one imaging device 102, to image an item scanned through the area or volume from more than one direction.

Barcode scanner 100 can optionally include one or more additional elements that can assist with the task of processing purchased items in a checkout transaction. A scale 104 can use a horizontal cover glass, or another suitable horizontal surface, to weigh produce or other grocery items that are sold be weight. A speaker 106 can emit a beep, or other suitable tone, to indicate a successful scan of an item. The speaker 106 can optionally emit a beep of a different pitch or different tone, to indicate an unsuccessful scan of an item. Display lighting 108 can emit a visual signal, such as a green light or a non-blinking light, to indicate a successful scan of an item. Display lighting 108 can emit a different visual signal, such as a red light or a blinking light, to indicate an unsuccessful scan of an item. Scan field lighting 110 can be switched on and off as needed, and optionally adjusted based on a detected presence of an item to be scanned. A communication interface 112 can include a screen facing a checkout clerk, and can optionally include an additional screen facing a customer. The communication interface 112 can optionally include a keypad for entering PINs and other data. The communication interface 112 can optionally include a swipe element for swiping credit cards.

During use, the barcode scanner 100 operates according to instructions executed on a processor 114. The processor 114 can include one or more of an application integrated circuit (ASIC), a digital signal processor, a microprocessor, or another suitable type of processor. Some or all of the instructions can be embedded in firmware 118. Some or all of the instructions can be included in software 120 stored in memory 116. Memory 116 can include one or more of volatile memory, non-volatile memory, write-protected memory, write-once memory, random access memory (RAM), read only memory (ROM), secure memory, and other memory and data storage types and devices.

Configuration settings 122 can configure operation of the barcode scanner 100 and its components. For example, the configuration settings 122 can control units of the scale 104, a volume of the speaker 106, a brightness of the display lighting 108, a decoding algorithm of the one or more imaging devices 102, one or more communication protocols used to communicate data from the barcode scanner 100 to a point-of-sale (POS) device or other network via wired or wireless connections, a version of firmware 118, a version of software 120, and/or other suitable settings.

A communication interface 124 can allow the barcode scanner 100 to communicate with one or more wired or wireless networks or devices. For instance, the communication interface 124 can communicate with a point-of-sale terminal disposed in a checkout station with the barcode scanner 100.

Memory 116 also can include one or more specified object profiles 126. Each specified object profile 126 can be recognized by the barcode scanner 100 and used to demarcate a redaction area in a field of view of a camera. An example of a suitable object profile is a one-dimensional or two-dimensional barcode. During use, the barcode scanner 100 can routinely scan and recognize one-dimensional and/or two-dimensional barcodes. In some examples, when the barcode scanner 100 recognizes a specified barcode, such as a barcode saved in the specified object profiles 126, the barcode scanner 100 can execute a procedure to redact an area of the field of view, where the boundary of the redaction area can be defined by the specified object. In some embodiments, rather than recognizing a specified barcode, the barcode scanner 100 decodes a scanned barcode to obtain the data encoded therein which includes specified data, such as one or more commands, that is recognized by the barcode scanner. The specified data, when received by the barcode scanner 100 causes the barcode scanner to execute the procedure to redact the area of the field of view, where the boundary of the redaction area can be defined by the specified object from which the barcode including the specified data was scanned.

The barcode scanner 100 of FIG. 1 is but one example of a device that includes a camera directed at a scene. Other suitable devices having cameras can also be used.

Figure 2:
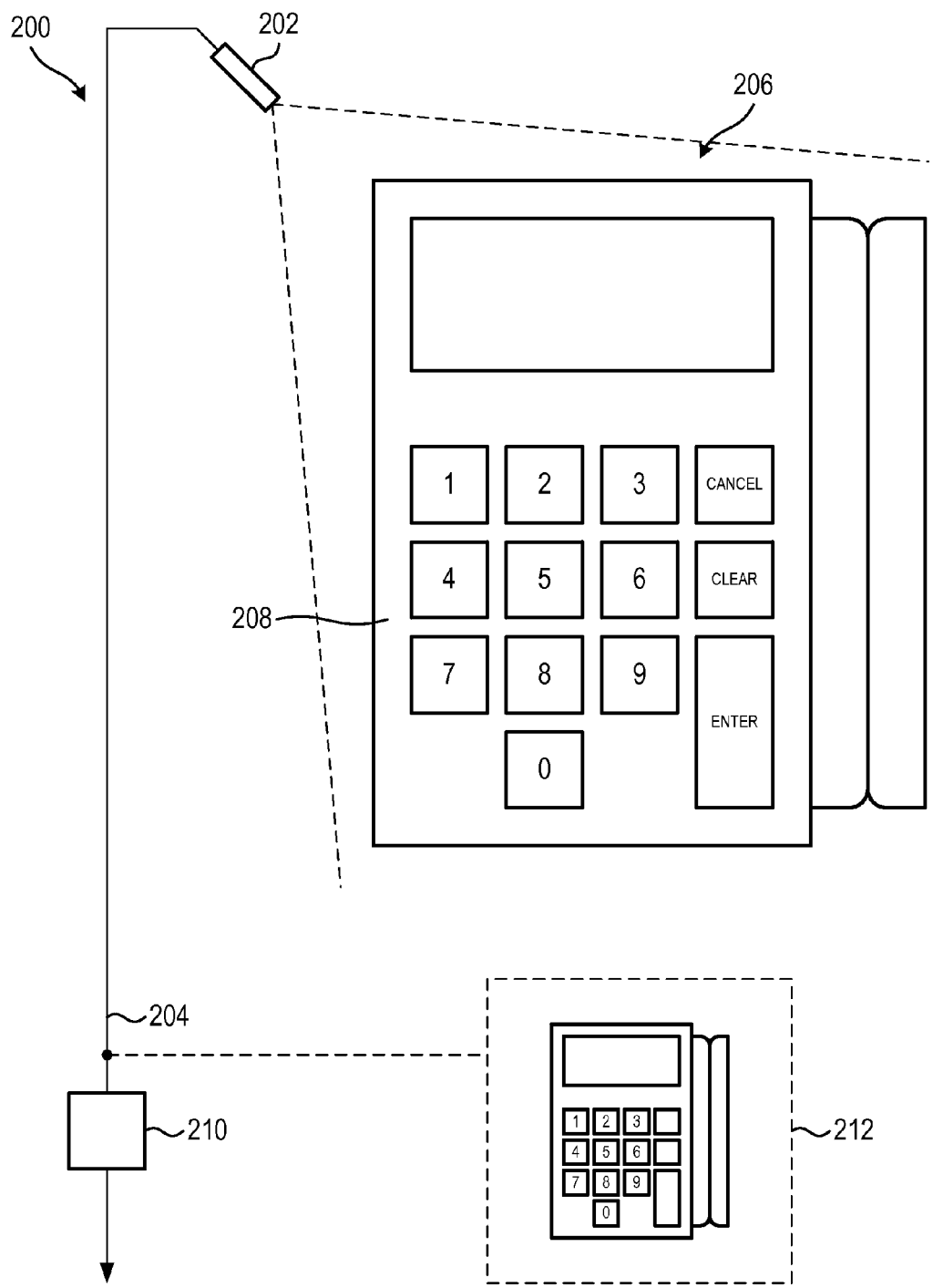
FIG. 2 shows an example of a video camera having a field of view, and a processor, in accordance with some embodiments.
Figure 3:
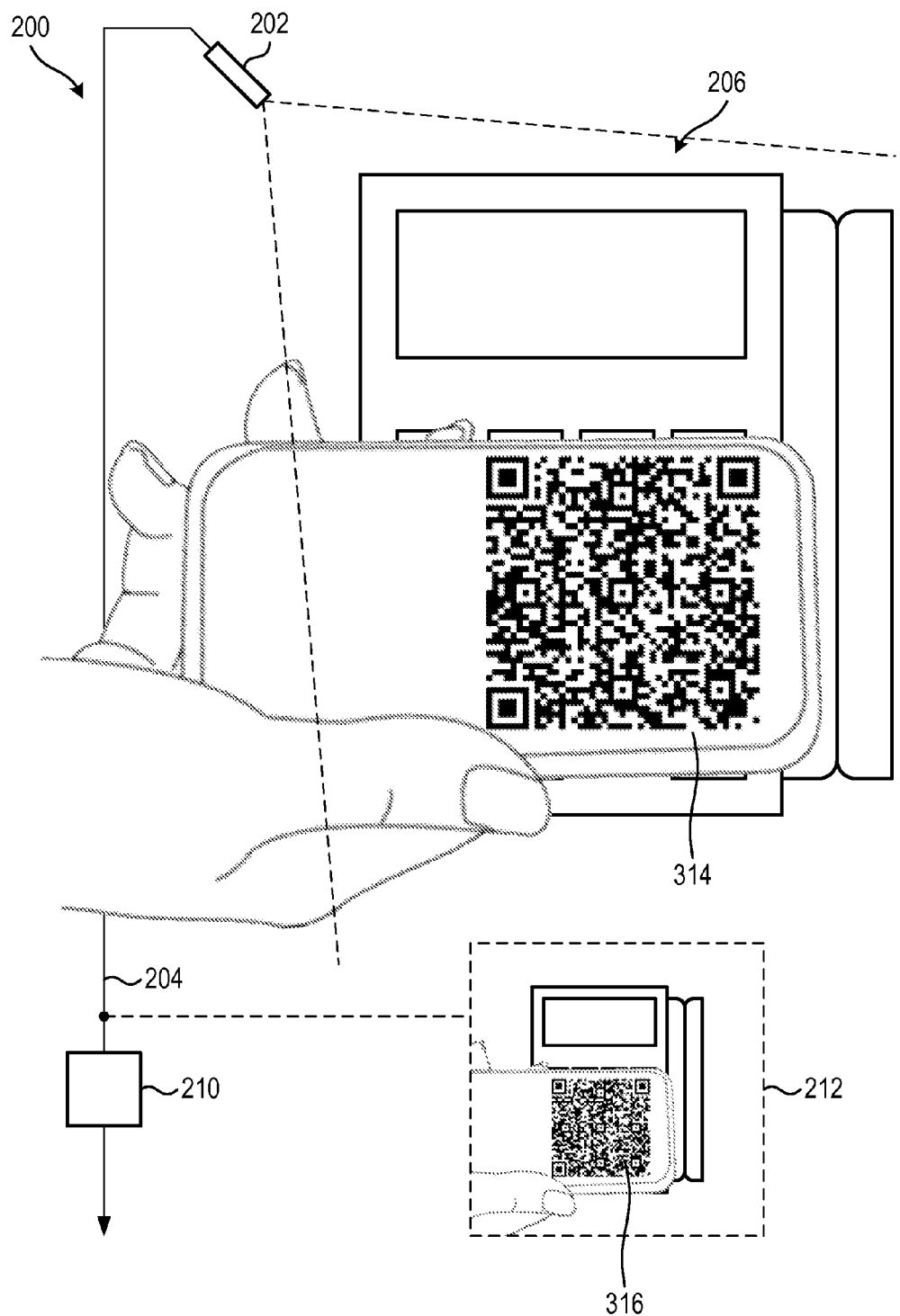
FIG. 3 shows an example of a user temporarily positioning a specified object in the field of view of the camera, in accordance with some embodiments.
Figure 4:
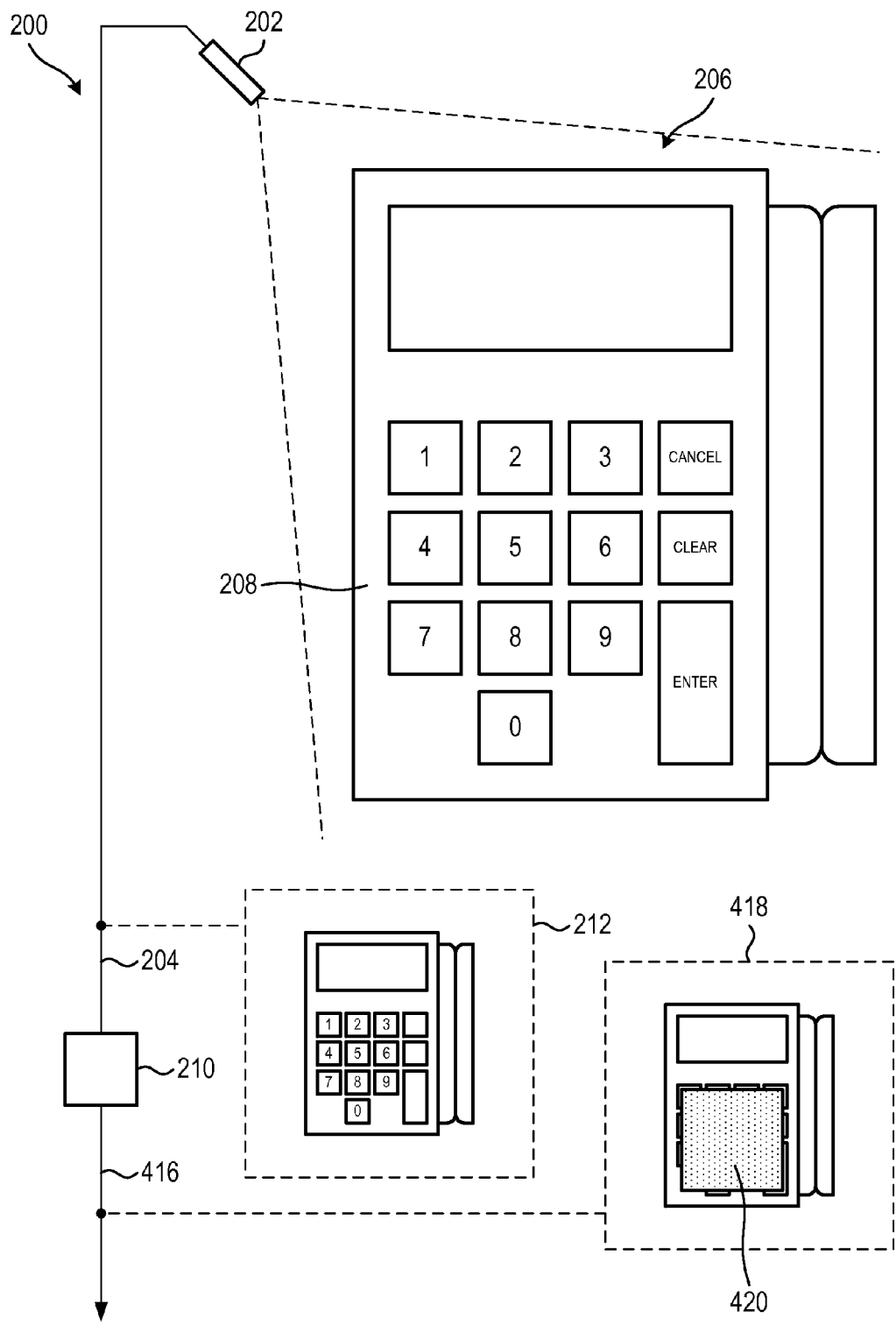
FIG. 4 shows a block diagram of an example of a barcode scanner outputting both a redacted video stream and an unredacted video stream, in accordance with some embodiments.

FIGS. 2-4 show an example of a barcode scanner 200 for producing a redacted video stream, in accordance with some embodiments. FIG. 2 shows the barcode scanner 200 before redacting the video stream. FIG. 3 shows the barcode scanner 200 during demarcation of a redaction area in a field of view of the video stream. FIG. 4 shows the barcode scanner 200 producing a video stream that redacts the redaction area of the field of view. The barcode scanner 200 of FIG. 2 is but one example; other suitable devices can also be used.

Barcode scanner 200 can include a camera 202, such as a camera included with one or more imaging devices 102 (FIG. 1). Camera 202 can be positioned to generate a video stream 204 of a scene 206.

In some examples, the scene 206 can be stationary with respect to the camera 202. In the example of FIGS. 2-4, the scene 206 includes a keypad 208, which can remain at the same location in the scene 206 from transaction to transaction. During typical use of the barcode scanner 200, customers can enter and exit the scene 206 at the beginning and end of each transaction, but the keypad 208 remains stationary in the scene 206 from transaction to transaction. In the examples of FIGS. 2-4, the keypad 208 is intended to represent an object at which sensitive information can be displayed. In other examples, such an object can include a tray upon which credit cards are laid, a tray upon which checks are written, or other suitable objects.

Barcode scanner 200 can further include a processor 210, such as processor 114 (FIG. 1). Barcode scanner 200 can further include memory, such as 116 (FIG. 1), which can include instructions that, when executed on the processor 210, cause the processor to demarcate a redaction area within a field of view 212 of the video stream 204.

FIG. 2 shows the barcode scanner 200 before redacting the video stream 204. To begin the process of demarcate the redaction area, a user can enter a configuration mode through the communication interface 112 (FIG. 1), such as by depressing a series of keystrokes on a keyboard. In some examples, the user can enter the configuration mode by swiping a specified barcode through the scene 206. Once the barcode scanner 200 has entered the configuration mode, FIG. 3 shows the barcode scanner 200 during demarcation of the redaction area in the field of view 212 of the video stream 204.

During the demarcation process, a user temporarily physically positions an object within the scene 206, the barcode scanner 200 recognizes the object, and the device demarcates the redaction area within the field of view 212 of the video stream 204. The redaction area can have a location within the field of view 212 that corresponds to the temporary position of the object in the scene 206.

In some examples, the object can be recognizable by the barcode scanner 200. In the specific example of FIGS. 2-4, the object is a smart phone that can display a specified barcode 314 recognizable to the processor 210. During the demarcation process, the barcode scanner 200 can recognize that a barcode is present in the field of view 212 of the video stream 204, can compare the barcode to one or more specified barcodes that can be stored in memory as specified object profiles 126 (FIG. 1), can determine that the barcode is one of the specified object profiles 126 (FIG. 1), and can demarcate a redaction area in the field of view 212 of the video stream 204 at the location within the field of view 212 of the barcode 316. In some examples, the smart phone can be further configured to graphically display at least an outline of the redaction area superimposed on the video stream 204. In some examples, the processor 210 can augment the redaction area in response to physical movement of the object within the scene. For instance, in the example of FIG. 3, the user can wave the smart phone displaying the specified barcode 314, and can expand the redaction area to include the area within the field of view cumulatively occupied by the barcode 314 during the waving.

In some examples, the barcode scanner 200 can optionally include a mode that allows a user to manually adjust the border of the redaction area, such as through a graphical user interface presented to the user. For instance, a smart phone, tablet, personal computer, or other suitable computing device can be further configured to graphically display at least an outline of the redaction area superimposed on the video stream. In some examples, a graphical user interface on the computing device can allow the user to manually adjust the outline of the redaction area as needed, then save the adjusted outline.

Once the user is satisfied with the border of the redaction area, the barcode scanner 200 can save the border of the redaction area and exit the configuration mode. The barcode scanner 200 can then blur, shade, black out, or otherwise obscure, the redaction area of the video stream 204. The redaction area can remain obscured after the object is physically removed from the scene.

FIG. 4 shows the barcode scanner 200 producing a redacted video stream 416. Redacted video stream 416 has the same field of view 418 as the field of view 212 of the un-redacted video stream 212, but with the addition of blurring, shading, blacking out, or other obscuration within the redaction area 420. During use, as a transaction occurs, the redacted video stream 416 blurs out the keypad 208, so that the redacted video stream 416 does not capture a PIN entered by the customer. As a result, the redacted video stream 416 has a reduced security risk, compared with the un-redacted video stream 204.

There can be instances when the device can override the redaction. Such an override can be used against potential shoplifters. For instance, a shoplifting customer, attempting to move a checkout item from the checkout queue to a checkout bag, can inadvertently pass the checkout item in front of one of the device's cameras. The checkout item can have a barcode. The device can identify the barcode in the camera's field of view, and can verify that the identified barcode corresponds to an item for sale. In order to ensure that video stream includes evidence that the customer is attempting to shoplift the checkout item, the device can leave the image of the identified barcode in the redacted video, even if the identified barcode appears in the redacted area. The temporarily non-redacted portion in the redacted area can follow the identified barcode as it moves through the field of view of the video stream.

As a specific example of overriding the redaction, the device can automatically recognize, with the processor, a barcode in the redaction area within the field of view of at least one frame of the video stream. In this example, the device can automatically identify, with the processor, the barcode as corresponding to one of a plurality of specified retail items. In this example, the device can automatically obscure, with the processor, the redaction area, excluding the recognized barcode, within the field of view of the video stream of the scene to form a redacted video stream of the scene.

There are alternatives to having the device recognize a specified barcode, then demarcating the redaction area around the recognized barcode. For instance, in an alternative scheme, a user can cover with an object the area in the scene at which sensitive information is expected. Examples of suitable objects can include an index card, a piece of cloth, a self-adhesive piece of paper, and so forth. The device can acquire an image, from one or more frames of video, of the object blocking the area in the scene. The device can additionally acquire an image of the same scene, but without the object; this image can be acquired before the object is placed within the scene or after the object has been removed from the scene. The device can subtract the two images to form a difference image. The difference image shows strong features in the area occupied by the object, and is relatively featureless outside the area occupied by the object. The device can apply threshold, edge recognition, and/or other suitable image processing techniques to extract the boundary of the object within the field of view. The device can set the boundary of the redaction area to coincide with the boundary of the object. The device can optionally allow the user to manually adjust the boundary of the redaction area, such as through a graphical user interface.

Figure 5:
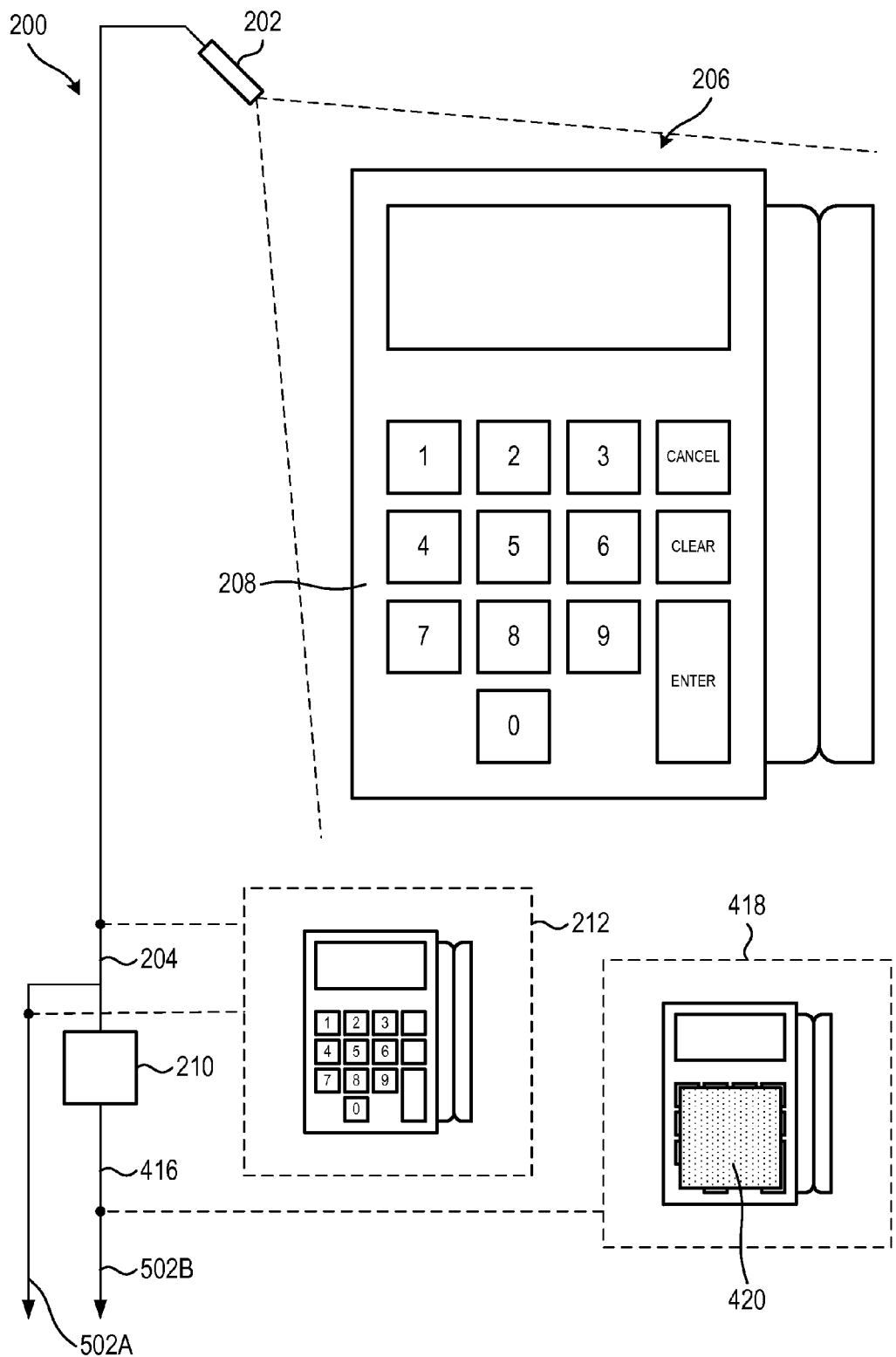
FIG. 5 shows an example of a video camera and processor producing a redacted video stream, in accordance with some embodiments.

FIG. 5 shows the barcode scanner 200 of FIGS. 2-4, outputting both a redacted video stream 502B and an unredacted video stream 502A. In some examples, the barcode scanner 200 can produce multiple video streams, which can be output through corresponding ports on the barcode scanner 200, or through corresponding communication channels associated with the barcode scanner 200.

As a specific example, the barcode scanner 200 can provide an unredacted video stream, which includes driver's license information, to a point-of-sale device over a high-security, encrypted USB connection. In this specific example, the barcode scanner 200 can simultaneously provide a redacted video stream, which redacts the driver's license information, to a digital recording system of a low-security Ethernet connection.

As an alternative, the barcode scanner 200 can provide multiple video stream outputs having different redacted areas. For instance, the high-security USB connection can output a video stream having a PIN keypad blurred, while a low-security Ethernet connection can output a video stream having the PIN keypad blurred, and additionally blurring an area around a MSR magnetic swipe (stripe) card reader. These are but mere examples, and other suitable video output configurations can also be used.

Figure 6:
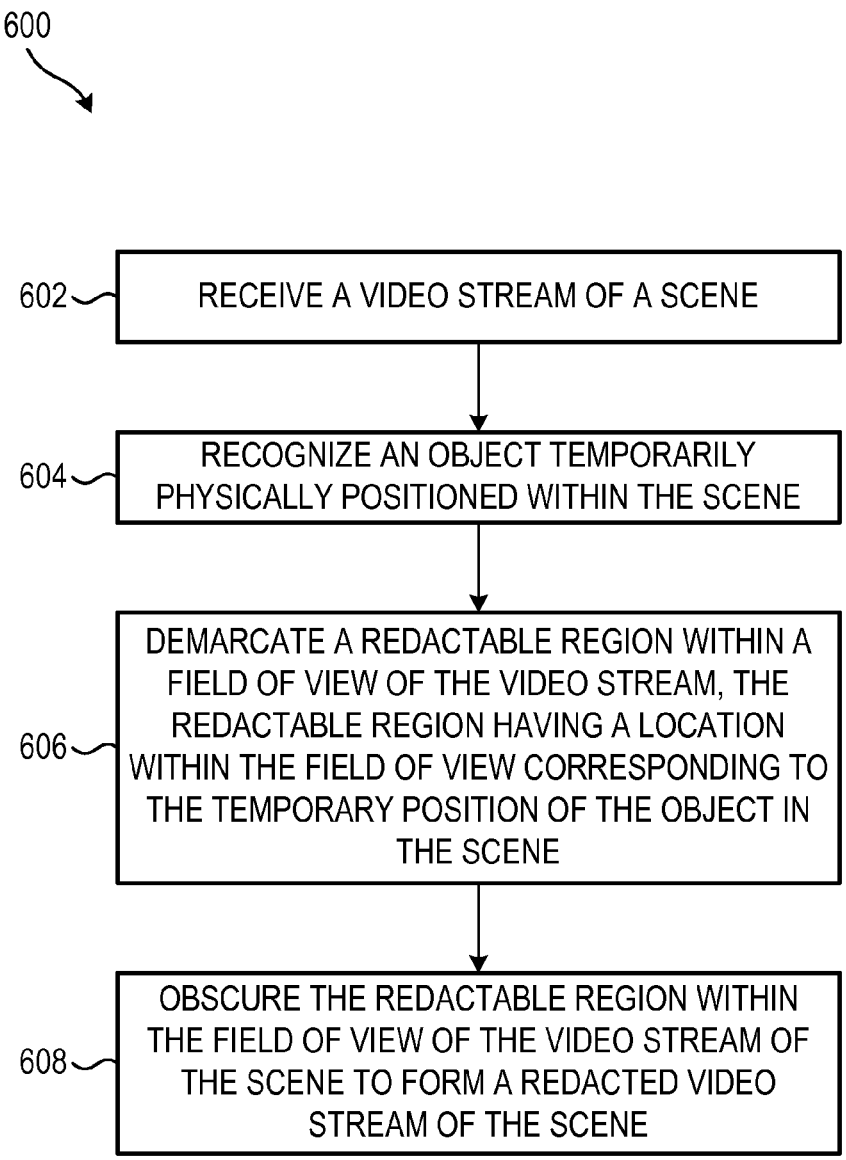
FIG. 6 shows a flow chart of an example of a method for producing a redacted video stream, in accordance with some embodiments.

FIG. 6 shows a flow chart of an example of a method 600 for producing a redacted video stream, in accordance with some embodiments. The method 600 can be executed on a barcode scanner, such as 100 (FIG. 1), a device including a camera positioned to generate a video stream of a scene, such as 200 (FIGS. 2-4), or another suitable device. The method 600 is but one example of a method for producing a redacted video stream; other suitable methods can also be used.

At operation 602, a processor can receive a video stream of a scene. In some examples, the scene is stationary with respect to a camera that generates the video stream.

At operation 604, the processor can automatically recognize an object temporarily physically positioned within the scene from the video stream. In some examples, the object can include a specified barcode recognizable to the processor. In some examples, the object can be a smart phone configured to display the specified barcode. In some examples, automatically recognizing the object can include subtracting a first image of the scene from a second image of the scene, the first and second images being frames from the video stream, the first image including the object within the scene, the second image lacking the object.

At operation 606, the processor can automatically demarcate a redaction area within a field of view of the video stream. The redaction area can have a location within the field of view corresponding to the temporary position of the object in the scene. In some examples, the processor can augment the redaction area in response to physical movement of the object within the scene. In some examples, the smart phone can be further configured to graphically display at least an outline of the redaction area superimposed on the video stream.

At operation 608, the processor can obscure the redaction area within the field of view of the video stream of the scene to form a redacted video stream of the scene. In some examples, the processor obscures the redaction area by blurring the redaction area. In some examples, the processor obscures the redaction area by blacking out the redaction area. In some examples, the redaction area remains obscured after the object is physically removed from the scene. In some examples, the processor can receive input on a graphical user interface to manually adjust a border of the redaction area.

Figure 7:
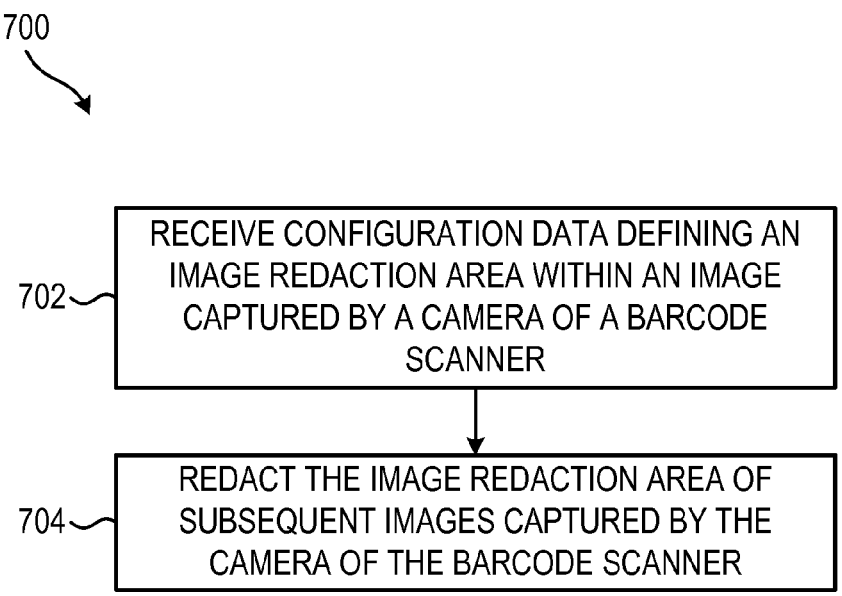
FIG. 7 shows a flow chart of another example of a method for producing a redacted video stream, in accordance with some embodiments.

FIG. 7 shows a flow chart of an example of another method 700 for producing a redacted video stream, in accordance with some embodiments. The method 700 can be executed on a barcode scanner, such as 100 (FIG. 1), a device including a camera positioned to generate a video stream of a scene, such as 200 (FIGS. 2-4), or another suitable device. The method 700 is but one example of a method for producing a redacted video stream; other suitable methods can also be used.

At operation 702, configuration data can be received. The configuration data can define an image redaction area within an image captured by a camera of a barcode scanner.

In some examples, operation 702 can optionally include identifying an object within the image. In some examples, operation 702 can optionally include identifying a perimeter of the object within the image. In some examples, operation 702 can optionally include storing, within a memory of the barcode scanner, data defining the image redaction area that identifies an area of the image within the perimeter of the object.

In some examples, operation 702 can optionally include capturing a first image of a scene when an object is within a field of view of the camera. In some examples, operation 702 can optionally include capturing a second image of the scene when the object is absent from the field of view of the camera. In some examples, operation 702 can optionally include subtracting the second image from the first image to form a difference image. In some examples, operation 702 can optionally include identifying a perimeter of the object within the difference image. In some examples, operation 702 can optionally include storing, within a memory of the barcode scanner, data defining the image redaction area as an area of the difference image within the perimeter of the object.

At operation 704, the image redaction area of subsequent images captured by the camera of the barcode scanner can be redacted. In some examples, redacting the image redaction area can optionally include blurring the image redaction area. In some examples, redacting the image redaction area can optionally include blacking out the image redaction area.

In some examples, method 700 can optionally include capturing the image when the object is within a field of view of the camera; and capturing the subsequent images when the object is absent from the field of view of the camera. In some of these examples, the object can includes thereon a barcode, the barcode including information which, when read by the barcode scanner, causes the barcode scanner to generate the image redaction area configuration data. In some of these examples, method 700 can optionally include sending data including barcode data to a smart phone, which, when processed by the smart phone, causes the smart phone to display a barcode representation generated from the barcode data. In some of these examples, method 700 can optionally include sending instructions to the smart phone, which, when executed by the smart phone, cause the smart phone to toggle between displaying the barcode representation and not displaying the barcode representation.

In some examples, method 700 can optionally include receiving input via a graphical user interface to manually adjust a border of the image redaction area.

In some examples, method 700 can optionally include recognizing a barcode in the image redaction area of a first subsequent image of the subsequent images; identifying the barcode as corresponding to one of a plurality of specified retail items; and overriding the redacting of the barcode in the first subsequent image.

In some examples, method 700 can optionally include forming an unredacted video stream from subsequent images captured by the camera of the barcode scanner; forming a redacted video stream from the redacting of the image redaction area of the subsequent images captured by the camera of the barcode scanner; and simultaneously providing the unredacted video stream and the redacted video stream as outputs from the barcode scanner.

In some examples, method 700 can optionally include forming first and second redacted video streams from subsequent images captured by the camera of the barcode scanner, the first and second redacted video streams having different image redaction areas; and simultaneously providing the first and second video streams as outputs from the barcode scanner.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, barcode scanners may include one or more processors and may be configured with instructions stored on a computer-readable storage device.

What is claimed is:

1. A method, comprising:
receiving configuration data defining an image redaction area within an image captured by a camera of a barcode scanner;
identifying an object within the image, the object including thereon a barcode, the barcode including information which, when read by the barcode scanner, causes the barcode scanner to generate the configuration data;
identifying a perimeter of the object within the image;
storing, within a memory of the barcode scanner, data defining the image redaction area that identifies an area of the image within the perimeter of the object;
capturing the image when the object is within a field of view of the camera; and
capturing subsequent images when the object is absent from the field of view of the camera;
redacting the image redaction area of the subsequent images captured by the camera of the barcode scanner; and
sending data including barcode data to a smart phone, which, when processed by the smart phone, causes the smart phone to display a barcode representation generated from the barcode data.

2. The method of claim 1, further comprising:
sending instructions to the smart phone, which, when executed by the smart phone, cause the smart phone to toggle between displaying the barcode representation and not displaying the barcode representation.

3. The method of claim 1, wherein receiving the configuration data comprises:
capturing a first image of a scene when an object is within a field of view of the camera;
capturing a second image of the scene when the object is absent from the field of view of the camera;
subtracting the second image from the first image to form a difference image;
identifying a perimeter of the object within the difference image; and
storing, within a memory of the barcode scanner, data defining the image redaction area as an area of the difference image within the perimeter of the object.

4. The method of claim 1, further comprising:
receiving input via a graphical user interface to manually adjust a border of the image redaction area.

5. The method of claim 1, further comprising:
recognizing a barcode in the image redaction area of a first subsequent image of the subsequent images;
identifying the barcode as corresponding to one of a plurality of specified retail items; and
overriding the redacting of the barcode in the first subsequent image.

6. The method of claim 1, further comprising:
forming an unredacted video stream from subsequent images captured by the camera of the barcode scanner;
forming a redacted video stream from the redacting of the image redaction area of the subsequent images captured by the camera of the barcode scanner; and
simultaneously providing the unredacted video stream and the redacted video stream as outputs from the barcode scanner.

7. The method of claim 1, further comprising:
forming first and second redacted video streams from subsequent images captured by the camera of the barcode scanner, the first and second redacted video streams having different image redaction areas; and
simultaneously providing the first and second video streams as outputs from the barcode scanner.

8. The method of claim 1, wherein redacting the image redaction area comprises blurring the image redaction area.

9. The method of claim 1, wherein redacting the image redaction area comprises blacking out the image redaction area.

10. A method, comprising:
receiving an input video stream from a camera on a barcode scanner;
identifying a first object within a field of view of a frame of the input video stream, the first object including thereon a barcode, the barcode including information which, when read by the barcode scanner, causes the barcode scanner to generate image redaction area configuration data;
identifying a perimeter of the first object within the field of view;
storing, within a memory of the barcode scanner, data defining the first image redaction area that identifies an area of the field of view within the perimeter of the first object;
forming a first redacted video stream by redacting a first image redaction area of the input video stream;
forming a second redacted video stream by redacting a second image redaction area, different from the first image redaction area, of the input video stream;
simultaneously providing the first and second redacted video streams as outputs from the barcode scanner; and
sending data including barcode data to a smart phone, which, when processed by the smart phone, causes the smart phone to display a barcode representation generated from the barcode data.

11. The method of claim 10, further comprising:
capturing a first image from the input video stream when an object is within a field of view of the input video stream;
capturing a second image from the input video stream when the object is absent from the field of view of the input video stream;
subtracting the second image from the first image to form a difference image;
identifying a perimeter of the object within the difference image; and
storing, within a memory of the barcode scanner, data defining the first image redaction area as an area of the difference image within the perimeter of the object.

12. The method of claim 10, further comprising:
recognizing a barcode in the image redaction area of a frame of the first redacted video stream;
identifying the barcode as corresponding to one of a plurality of specified retail items; and
overriding the redacting of the barcode in the frame of the first redacted video stream.

13. A barcode scanner, comprising:
a camera;
at least one processor; and
at least one memory, including instructions that, when executed on the at least one processor, cause the at least one processor to perform data processing activities comprising:
receiving first configuration data defining a first image redaction area within an image captured by the camera;
identifying an object within the image, the object including thereon a barcode, the barcode including information which, when read by a barcode scanner, causes the barcode scanner to generate the first configuration data;
identifying a perimeter of the object within the image;
storing, within a memory of the barcode scanner, data defining the first image redaction area that identifies an area of the image within the perimeter of the object;
capturing the image when the object is within a field of view of the camera; and
capturing subsequent images when the object is absent from the field of view of the camera;
redacting the first image redaction area of the subsequent images captured by the camera to form a first redacted video stream; and
sending data including barcode data to a smart phone, which, when processed by the smart phone, causes the smart phone to display a barcode representation generated from the barcode data.

14. The barcode scanner of claim 13, wherein the instructions, when executed on the at least one processor, cause the at least one processor to perform data processing activities further comprising:
receiving second configuration data defining a second image redaction area, different from the first image redaction area, within an image captured by the camera; and
redacting the second image redaction area of subsequent images captured by the camera to form a second redacted video stream;
wherein the barcode scanner simultaneously provides the first and second redacted video streams as outputs.

* * * * *